(12) United States Patent
Homma et al.

(10) Patent No.: US 8,218,106 B2
(45) Date of Patent: Jul. 10, 2012

(54) BULK DIFFUSER, AND POLARIZING PLATE AND LIQUID CRYSTAL DISPLAY APPARATUS COMPRISING THE SAME

(75) Inventors: Hideaki Homma, Ashikaga (JP); Takashi Nishihara, Soka (JP); Yusuke Tochigi, Tokyo (JP); Shigetomo Sakakibara, Koshigaya (JP)

(73) Assignee: Toppan Printing Co., Ltd., Tokyo (JP)

( * ) Notice: Subject to any disclaimer, the term of this patent is extended or adjusted under 35 U.S.C. 154(b) by 1185 days.

(21) Appl. No.: 11/984,422

(22) Filed: Nov. 16, 2007

(65) Prior Publication Data

US 2008/0123031 A1 May 29, 2008

(30) Foreign Application Priority Data

Nov. 29, 2006 (JP) ................................ P2006-321852

(51) Int. Cl.
*G02F 1/1335* (2006.01)
*G02B 5/02* (2006.01)
*F21V 7/04* (2006.01)

(52) U.S. Cl. ............................ 349/64; 359/599; 362/558

(58) Field of Classification Search .................... 349/64; 359/599; 362/558

See application file for complete search history.

(56) References Cited

U.S. PATENT DOCUMENTS

| 6,217,176 | B1 * | 4/2001 | Maekawa | 359/601 |
|---|---|---|---|---|
| 7,513,655 | B2 * | 4/2009 | Chang | 362/332 |
| 2003/0072080 | A1 * | 4/2003 | Ariyoshi et al. | 359/487 |
| 2005/0207139 | A1 * | 9/2005 | Kim et al. | 362/84 |

FOREIGN PATENT DOCUMENTS

| JP | 10-10513 | 1/1998 |
|---|---|---|
| JP | 2005-10509 | 1/2005 |

OTHER PUBLICATIONS

Japanese Office Action issued Jun. 21, 2011 in corresponding Japanese 2006-321852.

* cited by examiner

*Primary Examiner* — Jessica M Merlin

(57) ABSTRACT

A bulk diffuser including: a base material; and a diffusion layer which has a forming material and inner diffusion particles dispersed in the forming material, and is formed on the base material, wherein the inner diffusion particles include two or more types of spherical particles having different refraction indexes, and variations of cross-sectional area of scattering per unit volume of the bulk diffuser owing to a variation of a refraction index of the forming material are mutually cancelled by a combination of the inner diffusion particles.

7 Claims, 3 Drawing Sheets

BULK DIFFUSER, AND POLARIZING PLATE AND LIQUID CRYSTAL DISPLAY APPARATUS COMPRISING THE SAME

The present application is based on Japanese Patent Application No. 2006-321852 filed on Nov. 29, 2006, the content of which is incorporated herein by reference.

BACKGROUND OF THE INVENTION

1. Field of the Invention

The present invention relates to a bulk diffuser, and a polarizing plate and a liquid crystal display apparatus comprising the same, which are capable of suppressing luminance of a liquid crystal display apparatus from being lowered by suppressing a variation of scattering characteristic under an influence of humidity and by dispersing or diffusing light, thereby decreasing color variation in different view angles.

2. Description of Related Art

A transmission liquid crystal display apparatus is a display component represented by a flat panel display, which is lightweight, thin, and low in electric power consumption; thus, it is broadly used for a liquid crystal television, a car navigation system, a desktop or notebook personal computer, a cellular phone, a monitor for amusement, industrial, medical purposes or the like. Especially, the demand for television is increased for the liquid crystal display apparatus. Therefore, the liquid crystal display apparatus is requested to have a wide view angle and less confusion of gradation characteristic and color variation in order to view an image having many halftones from different angles.

The liquid crystal display apparatus includes a liquid crystal panel and a backlight unit which faces the liquid crystal panel and provides light to the liquid crystal panel. The liquid crystal panel includes, for example, a liquid crystal cell including a liquid crystal composed of bar-shaped liquid crystal molecules and a pair of substrates having electrodes to apply a voltage to the liquid crystal interposed between these substrates, RGB color filters which are interposed between the liquid crystal cell substrates arranged at a front of the liquid crystal display apparatus on which an image of the liquid crystal display apparatus is displayed, and a pair of polarizing plates which transmit only unidirectional oscillating light respectively with the liquid crystal cell interposed therebetween.

A liquid crystal display apparatus is proposed in which a diffusing film is provided for enlarging a field of view at a display surface of the liquid crystal panel (i.e., the front of the liquid crystal display apparatus) or the like (e.g., refer to Japanese Unexamined Patent Application, First Publication No. H10-10513).

However, the liquid crystal display apparatus cannot suppress the color variation enough even though the liquid crystal display apparatus has effects of enlarging the field of view and suppressing an inversion.

Therefore, a large number of diffusing films which can suppress color variation in different view angles while enlarging a field of view and suppressing luminance reduction, contrast reduction, and blurs of an image or a liquid crystal display apparatus using the same are developed A bulk diffuser is known as a diffusing film having a diffusion layer in which inner diffusion elements (particles) are dispersed in a forming material (medium).

However, the bulk diffuser having the inner diffusion elements dispersed in the forming material has a problem in which the dispersion characteristic greatly varies along with a variation of refraction index of the forming material. The bulk diffuser is disposed at a display surface of a liquid crystal panel or on a polarizing layer of a polarizing plate to be used for the liquid crystal display apparatus; therefore, the forming material is easily exposed to humidity in the atmosphere. The refraction index of the forming material tends to vary by moisture absorption. In addition, an acrylic resin, which is used for the forming material, has high moisture absorbency from the atmosphere and is easy to vary the refraction index; therefore, a variation of a diffusing characteristic is remarkable in the bulk diffuser formed of an acrylic resin.

SUMMARY OF THE INVENTION

The present invention has an object of providing a bulk diffuser, and a polarizing plate and a liquid crystal display apparatus which suppress a variation of a scattering characteristic owing to humidity.

A bulk diffuser according to the present invention includes a base material and a diffusion layer which has a forming material and inner diffusion particles dispersed in the forming material, and is formed on the base material, wherein the inner diffusion particles include two or more types of spherical particles having different refraction indexes, and variations of cross-sectional area of scattering per unit volume of the bulk diffuser owing to a variation of a refraction index of the forming material are mutually cancelled by a combination of the inner diffusion particles.

The inner diffusion particles may have a size corresponding to a range in which the variation of the cross-sectional area of scattering is from an extreme value to half of the extreme value. More preferably, the inner diffusion particles may have a size corresponding to a range in which the variation of the cross-sectional area of scattering is from an extreme value to 10% of the extreme value.

The inner diffusion particles may have: a size in a range which includes a minimum particle size showing a maximum extreme value of the cross-sectional area of scattering, the maximum extreme value appearing in a positive region of the variation of the cross-sectional area of scattering, and is limited by both particle sizes showing half of the maximum extreme value; and a size in a range which includes another minimum particle size showing a minimum extreme value of the cross-sectional area of scattering, the minimum extreme value appearing in a negative region of the variation of the cross-sectional area of scattering, and is limited by both particle sizes showing half of the minimum extreme value.

The inner diffusion particles may include particles with a higher refraction index and particles with a lower refraction index than a refraction index of the forming material.

The inner diffusion particles may include particles having wavelength-dependences of scattering contrary to each other.

A polarizing plate according to the present invention includes a polarizing layer and the bulk diffuser arranged on the polarizing layer.

A liquid crystal display apparatus according to the present invention includes the polarizing plate disposed at the front of the liquid crystal display apparatus where an image thereof is displayed.

According to the present invention, a bulk diffuser which can suppress a variation of scattering characteristic owing to humidity, a polarizing plate and a liquid crystal display apparatus having the bulk diffuser can be provided.

DESCRIPTION OF THE PREFERRED EMBODIMENTS

Hereinafter, a bulk diffuser, and a polarizing plate and a liquid crystal display apparatus having the same according to the present invention will be described with reference to FIGS. 1 to 4. The present embodiment relates to a liquid crystal display apparatus such as a liquid crystal television having a VA (i.e., vertical alignment) type liquid crystal panel in which liquid crystal molecules are vertically aligned, and relates to a bulk diffuser (i.e., a diffusion film) which suppresses variation of a scattering characteristic owing to humidity, and a liquid crystal display apparatus having a polarizing plate including the bulk diffuser.

Figure 1:
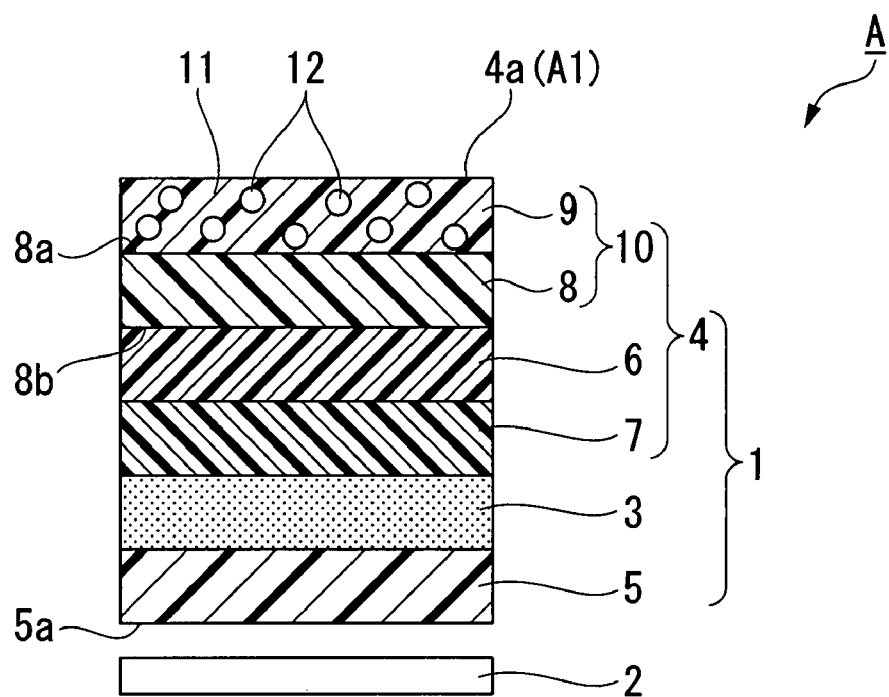
FIG. 1 is a sectional view showing a layer structure of a liquid crystal display apparatus according to an embodiment of the present invention.

As shown in FIG. 1, a liquid crystal display apparatus A of the present embodiment is provided with a liquid crystal panel 1 and a backlight 2 which illuminates the liquid crystal panel 1. The liquid crystal panel 1 includes a plate-shape VA type liquid crystal cell 3, and a first polarizing plate 4 and a second polarizing plate 5 laminated on both surfaces of the liquid crystal cell 3 with the liquid crystal cell 3 interposed therebetween. The liquid crystal panel 1 is arranged so that a front surface 4a of the first polarizing plate is disposed at a front A1 of the liquid crystal display apparatus A. The backlight 2 is arranged at a back surface 5a of the second polarizing plate. Light emitted from the backlight 2 is transmitted to the second polarizing plate 5, the liquid crystal cell 3, and the first polarizing plate 4.

The first polarizing plate 4 has a first base material 7, a second base material 8, and a polarizing layer 6 which is held between the first base material 7 and the second base material 8. The second polarizing plate 5 paired with the first polarizing plate 4 has a structure in which a polarizing layer is interposed between two base materials, like the first polarizing plate 4. The first polarizing plate 4 disposed at the front A1 of the liquid crystal display apparatus A has a bulk diffuser (i.e., a diffusion film) 10 which includes the second base material 8 and a diffusion layer 9 laminated on a first surface 8a of the second base material 8. The diffusion film 10 is laminated so that the diffusion layer 9 is disposed at the front A1 and a second surface 8b of the second base material 8 is in contact with the polarizing layer 6.

In addition, the bulk diffuser 10 may have another diffusion layer 9 on the second surface 8b of the second base material 8. In this case, the diffusion layer 9 on the second surface 8b is in contact with the polarizing layer 6.

It is suitable for the second base material 8 of the bulk diffuser 10 to be formed from a film-like transparent plastic base material; but it is not particularly limited. For example, the second base material 8 is a triacetyl cellulose (TAC) film, a polyethylene terephthalate (PET) film, a cycloolefin film, etc. In addition, the film-like plastic base material usually has a pencil hardness of 4 B to HB under a 500 g load (i.e., 4.9 N) based on a pencil hardness test (ISO/DIS 15184); however, the hardness is not limited in the present invention, so a film having any pencil hardness may be used.

Figure 2:
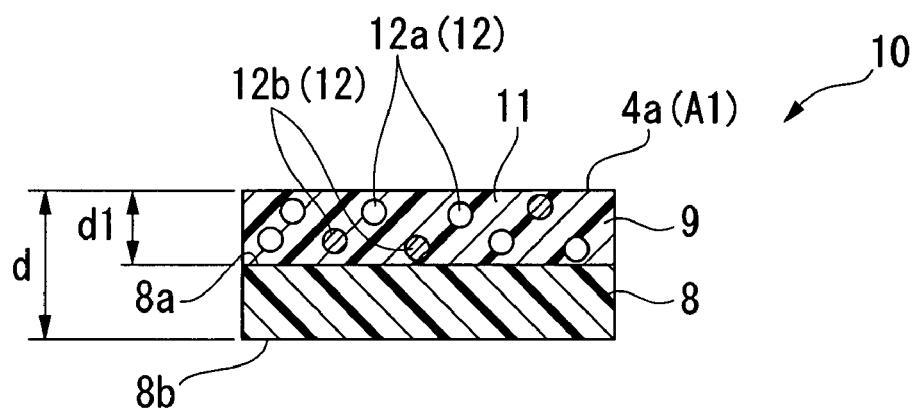
FIG. 2 is a sectional view showing a bulk diffuser according to the embodiment of the present invention.

In the present embodiment, as shown in FIGS. 1 and 2, the diffusing layer 9 includes a forming material (i.e., medium or binder) 11 and inner diffusion particles 12 dispersed in the forming material 11. As the inner diffusion particles 12 having different refraction indexes from the forming material 11 are dispersed in the forming material 11, a plurality of fine regions which are constituted by the inner diffusion particles 12 having different refraction indexes are formed in the diffusion layer 9. The inner diffusion particles 12 may be dispersed in the forming material 11 (i.e., in the diffusion layer 9) uniformly. Color variation and a rising in black level can be reduced and dazzling can be suppressed by scattering blue light, which has a particularly short wavelength in visible light, by the diffusion layer 9.

The forming material 11 may be formed from various resins; particularly, a radiation-curable type resin is suitable. In addition, the forming material 11 preferably has a hard-coated characteristic. For example, the forming material 11 is preferably a resin having acrylate functional groups, more preferably polyesteracrylates or urethaneacrylates.

The polyesteracrylates are preferably oligomeracrylates or methacrylates of polyester polyols (hereinafter, "acrylates and/or methacrylates" will be referred to as "(meth)acrylate") or a mixture thereof.

The urethaneacrylates are made by acrylating oligomers composed of a polyol compound and a diisocyanate compound.

Monomers of acrylates preferably include methyl(meth)acrylate, ethyl(meth)acrylate, butyl(meth)acrylate, 2-ethylhexyl(meth)acrylate, methoxyethyl(meth)acrylate, buthoxyethyl(meth)acrylate, phenyl(meth)acrylate, etc.

The acrylates may be used in combination with multi functional monomers. For example, the multi functional monomers may include trimethylolpropanetri(meth)acrylate, hexanediol(meth)acrylate, tripropyleneglycoldi(meth)acrylate, diethyleneglycoldi(meth)acrylate, pentaerythritoltri(meth)acrylate, dipentaerythritolhexa(meth)acrylate, 1,6-hexanedioldi(meth)acrylate, neopentylglycoldi(meth)acrylate, etc.

Examples of polyester oligomers include polyadipate polyols which are condensates of adipic acid and a glycol (ethyleneglycol, polyethyleneglycol, propyleneglycol, polypropyleneglycol, butyleneglycol, polybutyleneglycol, etc.) or a triol (glycerin, trimethylolepropane, etc.) and polysebaciate polyols which are condensates of sebacic acid and a glycol or a triol.

A polymerization initiator (I) may be mixed into the forming material 11 in order to polymerize the forming material 11 efficiently. The polymerization initiator (I) may be a compound which generates radicals when activation energy is supplied. For example, the polymerization initiator (I) may include 1-hydroxycyclohexylphenylketone, 2-hydroxy-2-methyl-1-phenylpropane-1-one, 2-methyl [4-(methylthio)phenyl]-2-morpholinopropane-1-one, 2,2-dimethoxy-1,2-diphenylethane-1-one, benzophenone, 1-[4-(2-hydroxyethoxy)phenyl]-2-hydroxy-2-methyl-1-propane-1-one, 2-benzyl-2-dimethylamino-1-(4-morpholinophenyl) butane-1-one, bis(2,6-dimethoxybenzoyl)-2,4,4-trimethylephentylphosphineoxide, etc. The content of the polymerization initiator (I) is 0.1 to 10 wt %, preferably 1 to 7 wt %, more preferably 1 to 5 wt % based on 100 wt % of the forming material.

A solvent need not to be particularly limited and may include: ketones such as methylethylketone, acetone, methylisobutylketone or the like; esters such as methyl acetate, ethyl acetate, butyl acetate or the like; aromatic compounds such as toluene, xylene or the like; ethers such as diethylether, tetrahydrofuran or the like; and alcohols such as methanol, ethanol, isopropanol or the like.

The inner diffusion particles 12 may be, for example, inorganic powders such as powdered glass, glass beads, pulverized glass fiber, titanium oxide, calcium carbonate, silicon dioxide (silica), aluminum oxide, various kinds of clays and the like; or resin powders such as crosslink-linked polymer resin fine particles. The inner diffusion particles 12 may be hollow particles, porous particles, composite particles, etc.

The inner diffusion particles 12 include spherical particles 12a and 12b having two or more refraction indexes as shown in FIG. 2.

The content of the inner diffusion particles 12 is preferably 3 wt % to 50 wt % of the diffusion layer 9. If the content of the inner diffusion particles 12 exceeds the above range, the inner diffusion particles 12 are condensed and easy to be lumped so that it is difficult to be applied to the second base material.

The bulk diffuser 10 having the diffusion layer 9 including the forming material 11 and the inner diffusion particles 12 as shown in FIGS. 1 and 2 is formed by coating a mixture solution (i.e., coating fluid) of the forming material 11 and the inner diffusion particles 12 on the first surface 8a of the second base material 8 using coating systems known in the art, such as a die coater, a spin coater, a roll coater, a curtain coater, a screen printer or the like, drying the mixture solution, and curing the dried mixture solution by irradiating the mixture solution with an electron beam (EB) or ultraviolet rays.

In the present invention, as shown in FIG. 2, the diffusion layer 9 is preferably formed to be 2 μm to 30 μm in thickness d1.

The above-mentioned bulk diffuser 10 has problems as stated below when the scattering characteristic thereof is to be raised.

The scattering characteristic can be raised by thickening the thickness d1 of the diffusion layer 9 so that the content of the inner diffusion particles 12 is relatively increased in the diffusion layer 9. However, it is undesirable to thicken the diffusion layer 9 since problems like curling would occur when the thickness is large.

On the other hand, the scattering characteristic can be raised by increasing the content of the inner diffusion particles 12 without enlarging the thickness d1 of the diffusion layer 9; however, it is preferable to restrain the content of the inner diffusion particles 12 in the diffusion layer in view of application operation.

Furthermore, the forming material 11 is easy to absorb humidity in the atmosphere; thus, the scattering characteristic is difficult to be stabilized since the refraction index of the forming material 11 varies owing to variation of the environment of the liquid crystal panel 1 or the liquid crystal display apparatus A.

Therefore, the inventors of the present invention conducted research into the above problems and detected that the diffusion amount (i.e., the diffusion characteristic) is important with respect to content unit of the inner diffusion particles 12 mixed into area unit and thickness unit of the bulk diffuser 10 in order to obtain a stabilized and higher diffusion characteristic.

The diffusion amount is calculated as described below. The diffusion amount in the present invention means the ratio of incident light intensity to diffused light intensity.

The diffusion amount of one particle in the bulk diffuser 10 is expressed by a cross-sectional area of scattering S obtained according to the following Equation (1).

$$S = Q \times A \tag{1}$$

The symbol A denotes the cross-section of a particle (i.e., $A = \pi \times$ particle radius: $\pi$ is the ratio of the circumference of a circle to its diameter). The symbol Q denotes the scattering factor and is obtained by the following Equation (2) according to Mie scattering theory.

$$Q_{sca} = \frac{2\left(\sum_{n=0}^{\infty}(2n+1)(|a_n|^2 + |b_n|^2)\right)}{x^2} \tag{2}$$

The symbol $\chi$, $a_n$, and $b_n$ are called size parameters. The value of $\chi$ is obtained by the following Equation (3).

$$\chi = 2\pi a/\lambda \tag{3}$$

The values of $a_n$ and $b_n$ are obtained by the following Equations (4) and (5).

$$a_n = \frac{\left(\frac{D_n(z)}{m} + \frac{n}{x}\right)\psi_n(x) - \psi_{n-1}(x)}{\left(\frac{D_n(z)}{m} + \frac{n}{x}\right)\xi_n(x)^2 - \xi_{n-1}(x)} \tag{4}$$

$$b_n = \frac{\left(mD_n(z) + \frac{n}{x}\right)\psi_n(x) - \psi_{n-1}(x)}{\left(mD_n(z) + \frac{n}{x}\right)\xi_n(x)^2 - \xi_{n-1}(x)} \tag{5}$$

The value of $\psi_n(\chi)$, which is expressed by using a spherical Bessel function of first kind J[n] which is contained in Ricatti-Bessel functions, is obtained by the following Equation (6). The value of $\xi_n(\chi)$, which is expressed by using a spherical Bessel function of second kind Y[n] which is contained in Ricatti-Bessel functions, is obtained by the following Equation (7).

$$\Psi_n(\chi) = \chi J_n(\chi) \tag{6}$$

$$\xi_n(\chi) = \psi n(\chi) - \chi Y n(\chi) I \tag{7}$$

The symbol $D_n$ is a function expressed by the following Equations (8) and (9).

$$D_n(z) = \frac{d}{dz} I_n(\psi_n(z)) \tag{8}$$

$$D_n(z) = -\frac{n}{z} + \frac{\psi_{n-1}(z)}{\psi_n(z)} \tag{9}$$

As described above, the scattering efficiency is obtained by series expansions of particular functions.

Next, a gross area Sn is expressed by the following Equation (10) when the bulk diffuser has a plurality of particles and the total number of the particles is N.

$$Sn = S \times N \tag{10}$$

Incident light intensity L to the bulk diffuser 10 and scattered light intensity Ls are explained by the following Equations (11) and (12) when an incident area is denoted by W and incident light intensity per unit area is denoted by P.

$$L = W \times P \qquad (11)$$

$$Ls = Sn \times P \qquad (12)$$

Therefore, the ratio of the incident light intensity to scattered light intensity H (i.e., the diffusion amount) is expressed by the following Equation (13) according to the above Equations (10) to (12).

$$H = Ls/L \qquad (13)$$
$$= Sn/W$$
$$= N \times S/W$$

Here, when the ratio of the volume of the total particles to the volume of the bulk diffuser 10 is denoted by ρv, the volume of the bulk diffuser 10 is denoted by V, and the volume of one particle is denoted by Vp, then the total number N of the particles is expressed by the following Equation (14).

$$N = (\rho v \times V)/Vp \qquad (14)$$

Therefore, the ratio H of the incident light intensity to the scattered light intensity (i.e., the diffusion amount) is expressed by the following Equation (15) according to the above Equations (13) and (14).

$$H = \rho v \times S \times V /(Vp \times W) \qquad (15)$$
$$= (S/Vp) \times \rho v \times V / W$$

Here, S/Vp is equal to the cross-sectional area of scattering per unit volume "μs" of the particle, and V/W is equal to the thickness "d" of the bulk diffuser 10; thus, Equation (15) is expressed by the following Equation (16).

$$H = \mu s \times \rho v \times d \qquad (16)$$

The weight ratio "ρv" of the particle and the thickness "d" of the bulk diffuser 10 are actually limited to prescribed values; therefore, the cross-sectional area of scattering per unit volume "μs" of the particle is ascertained to be an important factor for the diffusion amount (i.e., scattering characteristic).

In a case in which the refraction index is varied owing to absorption of the forming material 11 and the like, the weight ratio "ρv" of the particle and the thickness "d" of the bulk diffuser 10 are not varied since they are not influenced by the variation of the refraction index of the forming material 11; thus, it is sufficient to consider only the cross-sectional area of scattering per unit volume "μs" of the particle in order to suppress the variation of the scattering characteristic.

Here, when the refraction index of the forming material 11 is denoted by "n", the variation amount "μs'" of the cross-sectional area of scattering per unit volume "μs" with respect to variation of the refraction index "n" is explained by following Equation (17).

$$\mu s' = d\mu s/dn \qquad (17)$$

In a case in which the bulk diffuser 10 has a plurality of particles (e.g., the number of the particles is "i"), the variation amount "dH/dn" of the ratio of the incident light intensity to scattered light intensity is assumed to be obtained by the following Equation (18) when the variation of a cross-sectional area of scattering per unit volume of each particle is denoted by μsi' and the volume ratio of each particle to the bulk diffuser 10 is denoted by ρvi.

$$dH/dn = \sum \mu si' \times \rho vi \times d \qquad (18)$$
$$= \mu st\rho' \times d$$

Note, $\mu st\rho' = \sum \mu si' \times \rho vi$.

The thickness "d" of the bulk diffuser 10 is not altered. Therefore, the variation of the scattering characteristic can be suppress by minimizing the value of "μstρ" when the refraction index of the forming material 11 is varied owing to absorption of humidity and the like.

Minimizing in the present invention means that the particles cancel the variation (i.e., the difference) of the cross-sectional area of scattering per unit volume owing to the variation of the refraction index of the forming material 11. Specifically, it is preferable that an absolute value of the difference be 0.1 or less; more preferably, 0.05 or less.

Here, the minimizing of the variation of the scattering characteristic will be described with reference to FIGS. 3 and 4.

Figure 3:
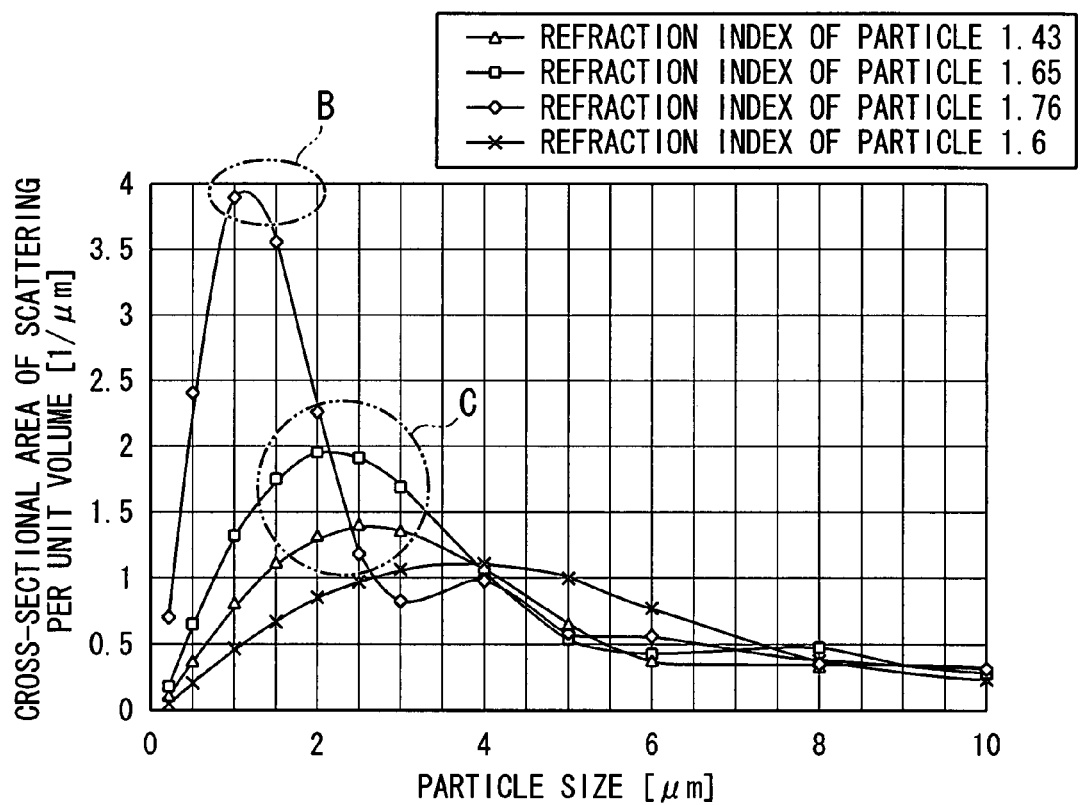
FIG. 3 is a graph showing a relationship between particle sizes of inner diffusion particles and cross-sectional areas of scattering per unit volume.

FIG. 3 is a graph showing a relationship between the particle sizes of inner diffusion particles and the cross-sectional areas of scattering per unit volume "μs" [1/μm] of the bulk diffuser 10 when four types of particles having refraction indexes in a range of 1.43 to 1.6 are dispersed in the forming material 11 with a refraction index of 1.53.

Figure 4:
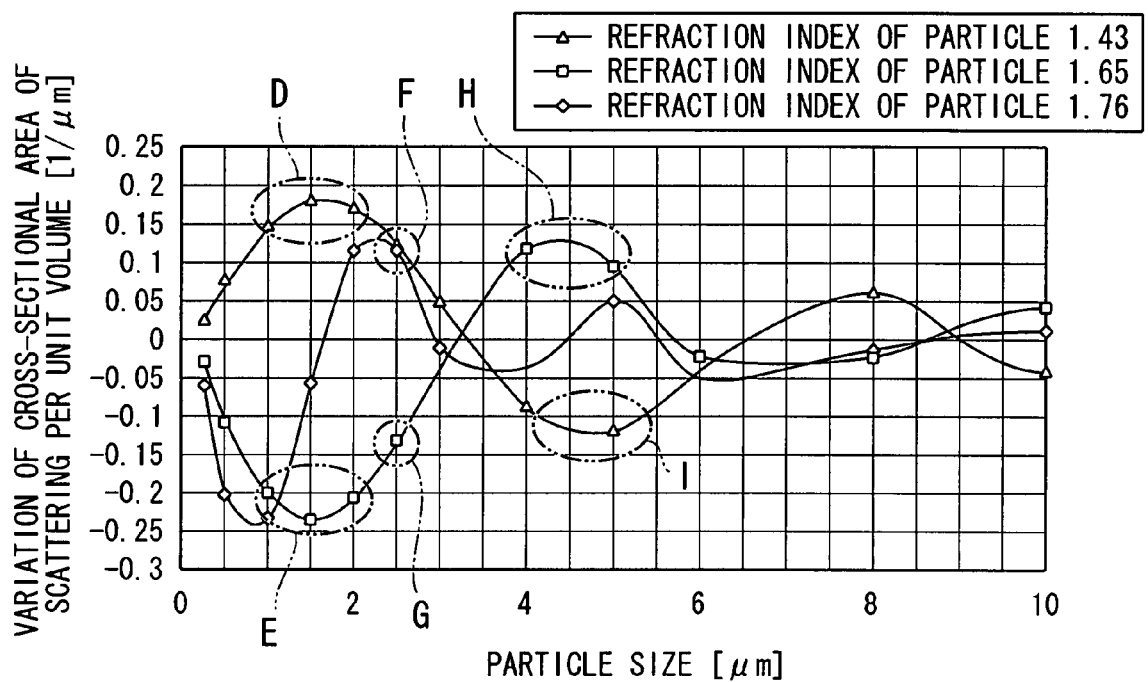
FIG. 4 is a graph showing a relationship between the particle sizes of the inner diffusion particles and variation of the cross-sectional areas of scattering per unit volume.

FIG. 4 is a graph showing the variation (i.e., the difference) of the cross-sectional area of scattering per unit volume of the bulk diffuser 10 when the refraction index of the forming material 11 is varied from 1.53 to 1.54.

As shown in FIG. 3, the larger the particle size, the smaller the cross-sectional area of scattering (hereinafter, "μs"). According to the above Equation (16), the diffusion amount is increased in proportion to "μs"; thus, scattering efficiency shows an extreme value when "μs" is in a range from 90% to 100% of the extreme value thereof (i.e., in ranges of B and C illustrated in FIG. 3). Therefore, the scattering characteristic can be efficiently improved by using the particles having the sizes in the range of B and C in FIG. 3 when the refraction index of the forming material 11 is not varied.

Hereinafter, the particles in the range of B are designated as "B-particles". The particles in the other ranges are designated in same way.

On the contrary, as shown in FIG. 4, the variation of the cross-sectional area of scattering per unit volume of the particles having sizes showing high scattering efficiencies shown in FIG. 3 (hereinafter, "the variation of the cross-sectional area") is varied largely when the refraction index of the forming material 11 is varied.

As described above, nearer the absolute value of the variation of the cross-sectional area approaches to zero, more effectively the variation of the scattering characteristic is suppressed. Therefore, the bulk diffuser 10 including the B-particles or the C-particles shown in FIG. 3 cannot provide a stable scattering characteristic since it is easy to be varied along with the variation of the refraction index of the forming material 11 owing to humidity absorbed from the atmosphere and the like.

The inventors of the present invention remarked that the variations of the cross-sectional area of the particles are separated to plus and minus with the particle size being variable according as the refraction indexes of the particles are large or small compared with that of the forming material 11.

Accordingly, the inventors of the present invention assumed that the variation of the scattering characteristic can be suppressed by using a combination of particles which mutually cancel the respective variations of the cross-sectional area of scattering, i.e., combinations of particles minimizing the absolute value of sum of the variation of the cross-sectional area of scattering, thereby minimizing relative variation of the cross-sectional area of scattering.

For example, specific combinations of the particles are D-particles and E-particles shown in FIG. 4, F-particles and G-particles, and H-particles and I-particles, etc. However, it is not limited if the combination of the particles includes two types or more having different refraction indexes and can mutually cancel the respective variations of the cross-sectional area of scattering.

As described above, according to the present invention, particles which include two types or more having different refraction indexes and which can mutually cancel the respective variations of the cross-sectional area of scattering are used as the inner diffusion particles 12. Therefore, even if the refraction index of the forming material 11 is varied owing to absorption of humidity, the relative variation of the cross-sectional area of scattering is minimized, thereby suppressing the variation of the scattering characteristic.

It is important to certainly maintain a regular quality for the bulk diffuser 10. However, the variation of the cross-sectional area of scattering of each particle is easy to be influenced by the variation of the particle size when particles having sizes in a area in which the variation of the cross-sectional area of scattering is varied rapidly along with the variation of the particle size, for example, F-particles and G-particles shown in FIG. 4, are used. Therefore, D-particles and E-particles are preferable to F-particles and G-particles for the bulk diffuser of the present invention.

The particles used as the inner diffusion particles 12 preferably have sizes in a range in which the variation of the cross-sectional area of scattering is from the extreme value to half of the extreme value. More preferably, the particles having sizes in a range in which the variation of the cross-sectional area of scattering is from the extreme value to 90% of the extreme value. Specific combinations of the particles are, for example, D-particles and E-particles, and H-particles and I-particles shown in FIG. 4 or the like.

The particle sizes can be measured by a method of calculating a particle size using a scattering profile obtained by shedding light on the particle, a method of fitting an edge of an image by a computer, the image obtained by an optical microscope or an electron microscope, or the like. The refraction indexes can be obtained by the Becke test or the Abbe test. However, actually, it is very difficult to accurately measure or obtain the refraction indexes of a binder (i.e., the forming material), the refraction indexes of the particles, the particle size, or the like; thus, they are different from theoretical values.

On the other hand, the cross-sectional area of scattering per unit volume is proportional to the Haze value (i.e., the diffusion amount H) before and after a durability test since the cross-sectional area of scattering per unit volume is proportional to the Haze value. Therefore, the maximum value, minimum value or the like of the cross-sectional area of scattering per unit volume according to the particle size shown in FIG. 3 can be obtained by obtaining the Haze value. That is to say, the particle size described here can be ordinarily considered as an average size if the above relationship is satisfied. In the present invention, the average particle size of the particles having a prescribed range of the particle size is preferably within the range in which the variation of the cross-sectional area of scattering is from the extreme value to half of the extreme value; more preferably, from the extreme value to 90% of the extreme value. The particle sizes can be considered within the above range if the average particle size is in the above range.

It is unnecessary for all particles to be included within the range in which the variation of the cross-sectional area of scattering is from the extreme value to half of extreme value; more preferably, from the extreme value to 90% of the extreme value, since the particles have various sizes. When the particle size distribution that indicates the distribution of the particle sizes by summing the number of particles from smaller particles to larger particles, if it is determined that the sizes where the sum of the numbers reaches 10%, 50%, and 90% as d10, d50, and d90, respectively, it is preferable that the d10, d50, and d90 are within the range in which the variation of the cross-sectional area of scattering is from the extreme value to half of extreme value; more preferably, from the extreme to 90% of the extreme value.

For example, Optbeads (by Nissan Chemical Industries, Ltd.) having a distribution of about ±0.5 mm in particle size are mostly included within the range in which the variation of the cross-sectional area of scattering is from the extreme value to half of the extreme value.

Specifically, for example, test bulk diffusers for obtaining the extreme values of the cross-sectional area of scattering are formed from an acrylic binder (i.e., the forming material) which is assumed to have a refraction index of 1.53 and melamine particles which are assumed to have a refraction index of 1.65. The particles are distributed into three groups each having an average size of 1.0 µm, 1.5 µm, and 2.0 µm measured by an identical measurement method. The three test bulk diffusers including different particle group, respectively, are left in an identical environmental of 65° C., 92% RH (i.e., relative humidity) for 120 hours. The scattering characteristics of the test bulk diffusers are measured by a Haze measurement method (JIS K7105) before and after the environmental test. The extreme values of scattering characteristics are obtained by a spline interpolation from the variations of the scattering characteristics between before and after the environmental test. The intervals between the average sizes of the particles are not limited to 0.5 µm as above. The intervals are preferable to be determined so as to be spline interpolated. The particles for practical use can be considered to be practically within a range of the present invention if the Haze variations between before and after the above test of the particles are within half of the extreme values.

As described above, two particles having different average sizes are selected. It is preferable to determine the contents of the two particles "µa" and "µb" so as to satisfy the following Equation (19) when the variations of the diffusion amount (i.e., the cross-sectional area of scattering) of the two particles are set as ΔHa and ΔHb.

$$\Delta Ha \times \mu a + \times Hb \times \mu b \rightarrow 0 \qquad (19)$$

Actually, this value does not reach zero. However, if the Haze variation (i.e., the variation of the diffusion amount) is within 5% between before and after the environmental test of 65° C., 92% RH for 120 hours, it can be considered to be applicable. More preferably, the variation is within 5% after exposing for 500 hours; more preferably, the variation is within 3%.

As described above, the influence by deviation of the particle size can be suppressed by using particles having a particle size corresponding to the range in which the variation of the cross-sectional area of scattering of the bulk diffuser 10 is from the extreme value to half of the extreme value; thereby, obtaining the bulk diffuser 10 having a stable quality.

As described above, the content of the inner diffusion particles 12 is limited in the diffusion layer 9. Therefore, in order to improve the diffusion characteristic (i.e., the scattering efficiency) within the limited content, small size particles should be used in principle. This is because of the relationship between the particle size and the cross-sectional area of scattering "µs" per unit volume shown in FIG. 3 and the proportional relationship between the diffusion amount and "µs" of the Equation (16) as described above. That is to say, the larger the particle size, the larger "µs"; as a result, the diffusion amount is enlarged in proportion to "µs", thereby improving the scattering efficiency.

Considering the above, it is preferable to use inner diffusion particles 12 having sizes in a range which includes a minimum particle size showing a maximum extreme value of the cross-sectional area of scattering, the maximum extreme value appearing in the positive region of the variation of the cross-sectional area of scattering, and is limited by both particle sizes showing half of the maximum extreme value; in combination with inner diffusion particles 12 having sizes in a range which includes another minimum particle size showing a minimum extreme value of the cross-sectional area of scattering, the minimum extreme value appearing in the negative region of the variation of the cross-sectional area of scattering, and is limited by both particle sizes showing half of the minimum extreme value. The ranges are more preferable to be limited by the particle sizes corresponding to 10% of the extreme values of the variation.

Specifically, the combination of the particles may be D-particles and E-particles shown in FIG. 4, for example.

As described above, according to the present invention, the bulk diffuser 10 is improved in the scattering efficiency by using the inner diffusion particles having sizes in the positive range which includes the minimum particle size showing the maximum extreme value of the cross-sectional area of scattering and is limited by both particle sizes showing half of the maximum extreme value and the inner diffusion particles having sizes in the negative range which includes the other minimum particle size showing the minimum extreme value of the cross-sectional area of scattering and is limited by both particle sizes showing half of the minimum extreme value In addition, as described above, comparing the particles having a higher refraction index with the particles having a lower refraction index than the refraction index of the forming material 11, the variations of the cross-sectional area of scattering are contraries in positive and negative when varying the particle size shown as FIG. 4. Therefore, it is prefer to use such combination of the particles since the variation of the cross-sectional area of scattering can be minimized more effectively.

In addition, it is preferable to use a combination of particles having mutually contrary wavelength-dependence of scattering to in order to whitely display the liquid crystal display apparatus A. For example, it is preferable to use particles scattering blue light strongly and particles scattering red light strongly as the inner diffusion particles 12.

Next, the functions and effects of the bulk diffuser 10 having the above construction and the first polarizing plate 4 and the liquid crystal display apparatus A having the same are described.

In the present embodiment, as shown in FIG. 1, the bulk diffuser 10 is disposed on the polarizing layer 6 of the first polarizing plate 4, i.e., it is disposed at the front A1 of the liquid crystal panel 1 (i.e., the front of the liquid crystal display apparatus); thus, light (i.e., visible light) transmitted thought the second polarizing plate 5, the crystal liquid cell 3, and the first polarizing plate 4 irradiated from the backlight 2 is diffused (i.e., is scattered), thereby decreasing color variation of the liquid crystal display apparatus in different view angles.

In addition, the bulk diffuser 10 of the present invention has a stable diffusion characteristic without influences from humidity of the atmosphere; thereby decreasing color variation of an image even if the environment of the liquid crystal display apparatus A is altered.

The first polarizing plate 4 at the front A1 of the liquid crystal panel 1 (i.e., the liquid crystal display apparatus A) is desired to be thin since it is arranged at front of the liquid crystal display apparatus A. Furthermore, it is necessary for to pay attention to humidity since the first polarizing plate 4 is easily exposed to the atmosphere.

On the contrary, with respect to the second polarizing plate 5, it is unnecessary to pay attention to humidity compared with the first polarizing plate 4 since the second polarizing plate 5 on the backlight 2 is arranged at the rear of the liquid crystal display apparatus A.

The bulk diffuser 10 of the present invention is useful to be used for the first polarizing plate 4 since the diffusion efficiency can be improved without thickening the thickness d1 of the diffusion layer 9 and the variation of the scattering characteristic owing to humidity can be restrained.

Furthermore, light transmitted through the diffusion layer 9 can be surely scattered by the diffusion layer 9 including the inner diffusion particles 12 dispersed in the forming material 11. The diffusion layer 9 in which the inner diffusion particles 12 are dispersed can be easily formed since the solution including the forming material 11 and the inner diffusion particles 12 is applied on the second base material 8 and cured by irradiating the same.

Therefore, since the variation of the scattering characteristic owing to humidity can be restrained by applying the bulk diffuser 10 of the present invention to the liquid crystal display apparatus A having a vertical-alignment type liquid crystal cell 3, deteriorations of contrast and luminance can be restrained while maintaining merits such as shades and costs and the like, of the liquid crystal display apparatus A such as a VA type liquid crystal TV or the like; thereby improving the gradation by wide scattering angle and correcting color appropriately.

The bulk diffuser may constitute a part of the first polarizing plate 4 in the present embodiment. However, the bulk diffuser 10 can be used separately from the polarizing plate. In addition, the bulk diffuser 10 (i.e., the first polarizing plate 4) may be provided with the VA type liquid crystal display apparatus A. However, the bulk diffuser 10 and the first polarizing plate 4 according to the present invention can be applied to, for example, a TN type (i.e., twisted nematic) liquid crystal display apparatus.

In addition, the bulk diffuser 10 and the polarizing plate 4 can be provided with a soil-resistance layer and an antistatic layer. Furthermore, additives can be added to the solution when the diffusion layer 9 is formed in order to give soil-resistance. The additive, for example, is a surface-active agent of silicone, fluorine, or the like.

Figure 5:
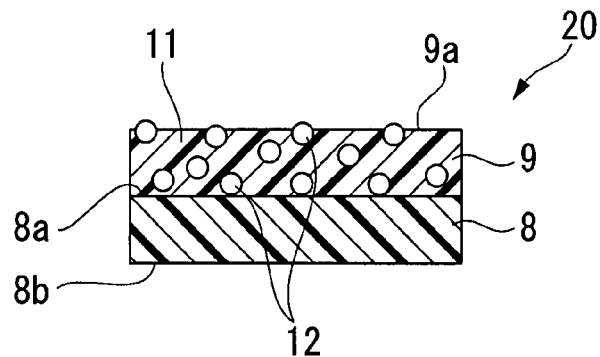
FIG. 5 is a sectional view showing a bulk diffuser according to a second embodiment of the present invention.
Figure 6:
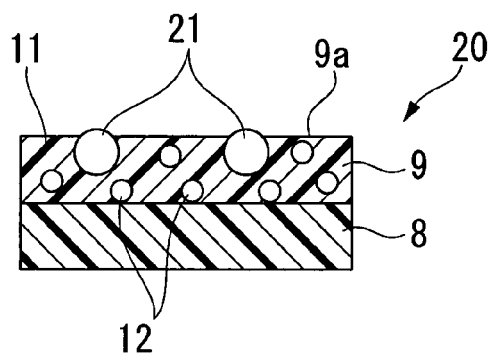
FIG. 6 is a sectional view showing a modification of the bulk diffuser of the second embodiment of the present invention.

In addition, as shown in FIG. 5, a bulk diffuser 20 of the present invention can be formed so that a part of the inner diffusion particles 12 are project from a surface 9a of the diffusion layer 9 (i.e., the front of the polarizing plate and the liquid crystal display apparatus). Thus, the surface 9a of the diffusion layer is formed unevenly.

In the bulk diffuser 20 which is constituted as above, deterioration of the visibility of light transmitted through the polarizing plate 4 and the bulk diffuser 20 owing to a refraction of outer light can be prevented by the unevenness of the surface 9a of the diffusion layer 9 when the outer light is irradiated onto the surface 9a. That is to say, antiglare properties can be greatly improved by forming the surface 9a of the diffusion layer 9 unevenly.

The surface 9a of the diffusion layer 9 can be formed unevenly by forming the bulk diffuser 20 so as to have unevenness forming particles 21 projecting from the surface 9a of the diffusion layer 9 along with the inner diffusion particles 12 mixed in the diffusion layer 9. The unevenness forming particles 21 are, for example, powdered glass, glass beads, pulverized glass fiber, titanium oxide, calcium carbonate, silicon dioxide (silica), aluminum oxide, various kinds of clays and the like; or resin powders such as crosslinking or non-crosslinking organic fine particles composed of various kinds of polymers such as polymethylmethacrylate (PMMA), polyurethane, melamine resin and the like. Further, the unevenness forming particles 21 may be hollow particles, porous particles, composite particles, etc. In addition, two or more kinds of the unevenness forming particles 21 may be used. The unevenness forming particles 21 are mixed preferably by 2 wt % to 50 wt %, more preferably by 5 wt % to 25 wt % based on 100 wt % of the medium (i.e., the forming material 11). Such unevenness forming particles 21 contribute to the improvement of antiglare properties like in the first embodiment. By projecting the inner diffusion particles 12 along with the unevenness forming particles 21 from the surface 9a, the surface 9a may be formed to be uneven by combination of the inner diffusion particles 12 and the unevenness forming particles 21.

Figure 7:
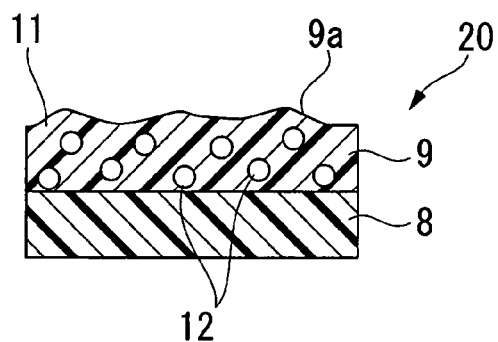
FIG. 7 is a sectional view showing a modification of the bulk diffuser of the second embodiment of the present invention.

The surface 9a can be formed to be uneven by subjecting a surface of the bulk diffuser 20 (i.e., the surface 9a of the diffusion layer 9) to an embossing treatment, as shown in FIG. 7, in addition to projecting the inner diffusion particles 12 and the unevenness forming particles 21 from the surface 9a in order to improve the antiglare properties. In other words, it is possible to improve the antiglare properties by making the surface 9a uneven through an antiglare process.

TEST EXAMPLE AND COMPARATIVE EXAMPLES

A Test Example of the present invention and Comparative Examples will be specifically described. However, the present invention is not limited to the Test Example.

Test Example

A mixed solution (1) is prepared by adding silica particles with a refraction index of 1.43 (particle size: 1.0 μm) and melamine particles with a refraction index of 1.65 (particle size: 1.5 μm) by a ratio of 1:1 into toluene.

A radiation-curable acrylic resin with a refraction index of 1.53 (SEIKA-BEAM available from Dainichiseika Color & Chemicals Mfg. Co., Ltd.) is further mixed into the mixed solution (1), so that a coating fluid (1) including the silica particles and the melamine particles dispersed in the radiation curable acrylic resin is prepared.

Then, the diffusion layer 9 and the bulk diffuser 10 are formed by applying the coating fluid (1) on a TAC film (FUJI-TAC available from FUJIFILM Corporation), heating the coating fluid (1) to volatilize a solvent contained in the coating fluid (1), and irradiating the coating fluid (1) with ultraviolet rays of about 500 mJ/cm$^2$ to cure the coating fluid (1).

The bulk diffuser 10 formed as above is uninfluenced by humidity in the atmosphere and has a high scattering characteristic.

Comparative Example 1

A mixed solution (2) is prepared by adding silica particles with a refraction index of about 1.43 (particle size: 1.0 μm) into toluene.

A coating fluid (2) is prepared by adding a radiation-curable acrylic resin with a refraction index of 1.53 (SEIKA-BEAM) into the mixed solution (2) so that the silica particles are dispersed in the radiation-curable acrylic resin.

Then, about a 10 μm diffusion layer and a bulk diffuser are formed by applying the coating fluid (2) on a TAC film (FUJI-TAC available from FUJIFILM Corporation), heating the coating fluid (2) to volatilize a solvent contained in the coating fluid (2), and irradiating the coating fluid (2) with ultraviolet rays of about 500 mJ/cm$^2$ to cure the coating fluid (2).

The diffusing film formed as above is varied with Haze of about 8% after 120 hours in an environment of 60° C., 92% RH.

Comparative Example 2

A mixed solution (3) is prepared by adding melamine particles with a refraction index of about 1.65 (particle size: 1.5 μm) into toluene.

A coating fluid (3) is prepared by adding a radiation-curable acrylic resin with a refraction index of 1.53 (SEIKA-BEAM) into the mixed solution (3) so that the melamine particles are dispersed in the radiation-curable acrylic resin.

Then, about a 10 μm diffusion layer and a bulk diffuser are formed by applying the coating fluid (3) on a TAC film (FUJI-TAC available from FUJIFILM Corporation), heating the coating fluid (3) to volatilize a solvent contained in the coating fluid (3), and irradiating the coating fluid (3) with ultraviolet rays of about 500 mJ/cm$^2$ to cure the coating fluid (3).

The diffusing film formed as above is varied with Haze of about −9% after 120 hours in an environment of 60° C., 92% RH.

Although Test Example of the present invention is shown and described, the present invention is not limited to this Test Example. It will be appreciated by those skilled in the art that changes may be made in this Test Example without departing from the principles and spirit of the present invention, the scope of which is defined in the appended claims and their equivalents.

What is claimed is:

1. A bulk diffuser comprising:
a base material; and
a diffusion layer which has a forming material and inner diffusion particles dispersed in the forming material, and is formed on the base material, wherein the inner diffusion particles include two or more types of spherical particles having different refraction indexes,
variations of cross-sectional area of scattering of the bulk diffuser owing to a variation of a refraction index of the forming material are mutually cancelled by a combination of the inner diffusion particles, and
the inner diffusion particles include particles with a higher refraction index and particles with a lower refraction index than a refraction index of the forming material.

2. The bulk diffuser according to claim 1, wherein a size of the inner diffusion particles is determined such that the variation of the cross-sectional area of scattering per unit volume is within a range from its extreme value to half of the extreme value.

3. The bulk diffuser according to claim 1, wherein the inner diffusion particles have:
   a size in a range which includes a minimum particle size showing a maximum extreme value of the cross-sectional area of scattering, the maximum extreme value appearing in a positive region of the variation of the cross-sectional area of scattering, and is limited by both particle sizes showing half of the maximum extreme value; and
   a size in a range which includes another minimum particle size showing a minimum extreme value of the cross-sectional area of scattering, the minimum extreme value appearing in a negative region of the variation of the cross-sectional area of scattering, and is limited by both particle sizes showing half of the minimum extreme value.

4. The bulk diffuser according to claim 1, wherein the inner diffusion particles include particles having wavelength-dependences of scattering contrary to each other.

5. The bulk diffuser according to claim 1, wherein a variation of $\Delta Ha \times \mu a + \Delta Hb \times \mu b$ is within 5%, $\Delta Ha$ and $\Delta Hb$ representing variations of a diffusion amount of the two types of spherical particles, and pa and pb representing contents of the two types of spherical particles.

6. A polarizing plate comprising a polarizing layer and a bulk diffuser arranged on the polarizing layer, the bulk diffuser including:
   a base material; and
   a diffusion layer which has a forming material and inner diffusion particles dispersed in the forming material, and is formed on the base material, wherein the inner diffusion particles include two or more types of spherical particles having different refraction indexes,
   variations of cross-sectional area of scattering per unit volume of the bulk diffuser owing to a variation of a refraction index of the forming material are mutually cancelled by a combination of the inner diffusion particles, and
   the inner diffusion particles include particles with a higher refraction index and particles with a lower refraction index than a refraction index of the forming material.

7. A liquid crystal display apparatus comprising a polarizing plate disposed at the front of the liquid crystal display apparatus where an image thereof is displayed, wherein
   the polarizing plate includes a polarizing layer and a bulk diffuser arranged on the polarizing layer, the bulk diffuser having:
   a base material; and
   a diffusion layer which has a forming material and inner diffusion particles dispersed in the forming material, and is formed on the base material, wherein
   the inner diffusion particles include two or more types of spherical particles having different refraction indexes,
   variations of cross-sectional area of scattering per unit volume of the bulk diffuser owing to a variation of a refraction index of the forming material are mutually cancelled by a combination of the inner diffusion particles, and
   the inner diffusion particles include particles with a higher refraction index and particles with a lower refraction index than a refraction index of the forming material.

* * * * *

UNITED STATES PATENT AND TRADEMARK OFFICE
CERTIFICATE OF CORRECTION

| | | |
|---|---|---|
| PATENT NO. | : 8,218,106 B2 | Page 1 of 1 |
| APPLICATION NO. | : 11/984422 | |
| DATED | : July 10, 2012 | |
| INVENTOR(S) | : Hideaki Homma et al. | |

It is certified that error appears in the above-identified patent and that said Letters Patent is hereby corrected as shown below:

Column 15, Line 26, In Claim 5, delete "pa and pb" and insert -- $\mu a$ and $\mu b$ --, therefor.

Signed and Sealed this
Sixteenth Day of October, 2012

David J. Kappos
*Director of the United States Patent and Trademark Office*